C. E. BRATT.
MANUFACTURE OF CASK STAVES.
APPLICATION FILED AUG. 30, 1909.
1,025,048.
Patented Apr. 30, 1912.
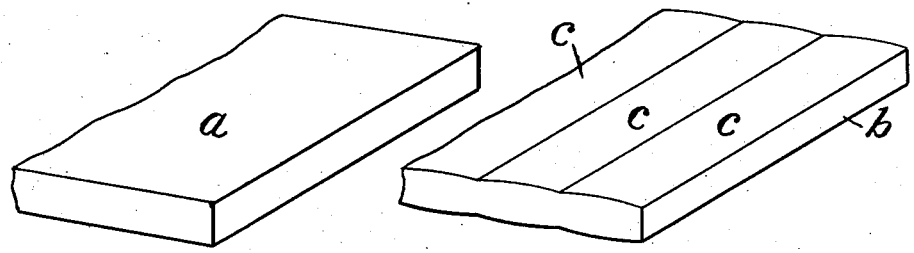
Fig. 1.   Fig. 2.
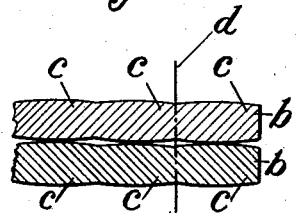   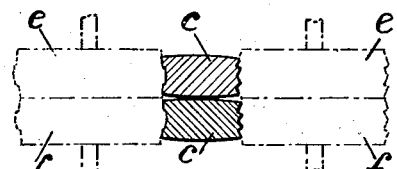
Fig. 3.   Fig. 4.
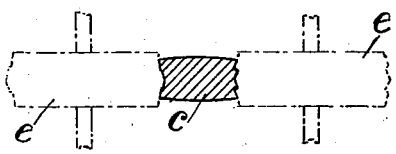   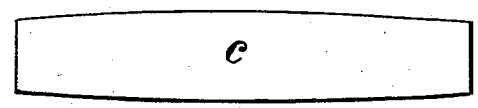
Fig. 5.   Fig. 6.
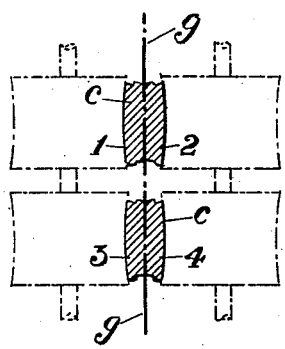   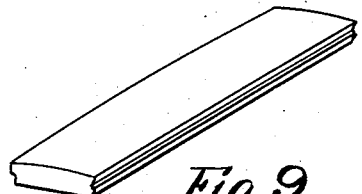
Fig. 7.
Fig. 8.   Fig. 9.
Witnesses:
E. R. Peck
C. P. Wright Jr.
Inventor:
Charles E. Bratt
by Herbert E. Peck
atty.
COLUMBIA PLANOGRAPH CO., WASHINGTON, D. C.

UNITED STATES PATENT OFFICE.

CHARLES ELIS BRATT, OF LONDON, ENGLAND.

MANUFACTURE OF CASK-STAVES.

1,025,048. Specification of Letters Patent. Patented Apr. 30, 1912.

Application filed August 30, 1909. Serial No. 515,309.

*To all whom it may concern:*

Be it known that I, CHARLES ELIS BRATT, of 28 Finsbury Square, London, England, sawmill engineer, have invented a certain new and useful Improvement in the Manufacture of Cask-Staves, of which the following is a specification.

My invention relates to the production of staves for the manufacture of tight bilged casks and barrels, and it has for its object to obtain staves of great accuracy in a rapid and economical manner.

According to the invention I take a piece of timber of any suitable width sufficient to give a plurality of staves, but of twice the thickness of the required stave, and this piece I cut to the right length of the desired stave; next I shape the piece transversely at the top and bottom to the necessary curved contour of the outer face or back of each stave, and to the width thereof; then I cut from the piece a strip of the width of the stave; next I shape both the edges of the strip to conform to the required configuration of the stave for fitting its neighbor on assembly, that is to say I simultaneously groove and tongue or otherwise joint, bevel and fashion it longitudinally; and finally I cut the strip in halves whereby I obtain two staves each having the inner and outer faces or backs and fronts straight and parallel to one another throughout their length, the outer face or back, though straight, being rounded as regards the inner face or front which is flat and straight, and further having, as usual, the sides shaped longitudinally so that from the transverse center line to the ends they taper inwardly to procure the gradual reduction in width from such center toward the ends, and having the edges jointed and beveled. The staves thus obtained are then dealt with in the ordinary way, that is to say they are, according to the sequence I prefer, subjected to the chiming, crozing and howeling machine, then assembled to "raise" the cask or barrel in the setting up apparatus, and closed by the windlassing machine whereby the required bilge is imparted to the staves.
To facilitate the action of the windlassing machine, the staves, preferably, are cross-cut to a slight depth about the middle of their length, this conveniently being performed by cutters provided for the purpose in the chiming, crozing and howeling machine.

I will now fully explain my invention with reference to the accompanying diagrammatic drawings in which the dot-and-dash lines, where employed, indicate part of the apparatus for carrying it into practice, and wherein:—

Figure 1 is a perspective view of a piece of timber from which the staves are to be obtained, such piece being double the thickness thereof and of any suitable width, but of the correct length. Fig. 2 is a perspective view of the same piece of timber shaped at the top and bottom to produce the staves of the desired width and peripheral contour or rounding at the outer faces or backs. Fig. 3 is a sectional elevation of two pieces shaped as illustrated in Fig. 2, and one strip of double stave thickness about to be cut from each piece simultaneously. Fig. 4 is a sectional elevation of two strips cut off as represented in Fig. 3, and being shaped simultaneously at the edges and longitudinally, that is to say being jointed, beveled and tapered. Fig. 5 is a sectional elevation of one strip cut off as depicted in Fig. 3 and being shaped simultaneously at the edges and longitudinally, that is to say being jointed, beveled and tapered. Fig. 6 is a plan of the strip after being shaped as depicted in Figs. 4 and 5; and Fig. 7 is a side elevation thereof, the right and left hand halves depicting the corresponding sides of the strip. Fig. 8 is a sectional elevation of two strips shaped as in Fig. 4 and being cut to produce four staves simultaneously, each finished ready for the subsequent ordinary operations previously explained, and Fig. 9 is a perspective view of such a finished stave.

The same letters of reference are used throughout to designate the same parts, and of them, *a*, Fig. 1, denotes the selected piece of timber cut to the right length of the stave to be produced, of double the thickness thereof, and flat at both sides. This piece *a* I feed into, and through, a molding machine of ordinary type between a pair of superposed cutters, with the result I obtain the piece *b* shown in Fig. 2, which figure indicates the formation of three strips *c, c, c*, each of the correct stave-length, but twice as thick as required for each stave.

When I have obtained the piece *b*, Fig. 2, as described I, as shown in Fig. 3, supplement it by another and feed them both together to, and past, a band saw *d* whereby I obtain two strips c, c, each of double the required stave thickness but of the right length. Of course I may so cut only one piece b, but I prefer to cut two such pieces simultaneously as it expedites production. Having obtained the two strips c, c or the one strip c, I feed them together, or it, as represented in Figs. 4 and 5 respectively, into, and through, an edging machine of any appropriate construction furnished in the one case with two pairs of superposed cutters e and f combined, though not so shown, with other necessary mechanism, or in the other case with one such pair e, for simultaneously shaping the interlocking edges of the staves or jointing them, for beveling them, and for shaping or tapering them longitudinally. Thus I obtain two strips, or one, of the form depicted in Figs. 6 and 7. By operating on two strips c, c at once obviously expedition accrues. Though a particular form of interlocking edge is illustrated, it will be understood it may be various. Finally I feed the strip c fashioned as in Fig. 4, or in Fig. 5, and in Figs. 6 and 7, either singly or, as shown in Fig. 8, in a pair to, and past, a band saw g whereby I obtain either two finished staves subject to the subsequent chiming, crozing and howeling operation as already pointed out, or, as indicated, by the numerals 1, 2, 3 and 4 in Fig. 8, four such staves. Rapidity of production ensues from cutting two strips c, c together as represented in Fig. 8.

What I claim as my invention and desire to secure by Letters Patent is:—

The herein described process of producing staves for the manufacture of tight bilged casks and barrels, which consists in cutting a piece of timber of any suitable width sufficient to give a plurality of staves, but of twice the thickness of the required stave, to the right length of the required stave; next shaping said piece transversely at the top and bottom to the required curved contour of the outer face or back of each stave, and to the width thereof; then cutting from said piece a strip equal to the width of the stave; next shaping both the edges of said strip to conform to the required configuration of the stave for fitting its neighbor on assembly, that is to say simultaneously grooving and tonguing or otherwise jointing, beveling and fashioning it longitudinally; and finally cutting said strip in halves whereby two staves of the desired dimensions and shape are obtained, finished except for the ordinary subsequent operation of chiming, crozing and howeling, substantially as described.

CHARLES ELIS BRATT.

Witnesses:
 JAMES ANDREW HARVEY,
 B. KNOTTNER.

---

Copies of this patent may be obtained for five cents each, by addressing the "Commissioner of Patents, Washington, D. C."